May 12, 1942.   S. E. BOUCHARD   2,282,637
OPHTHALMIC MOUNTING
Filed Jan. 17, 1941
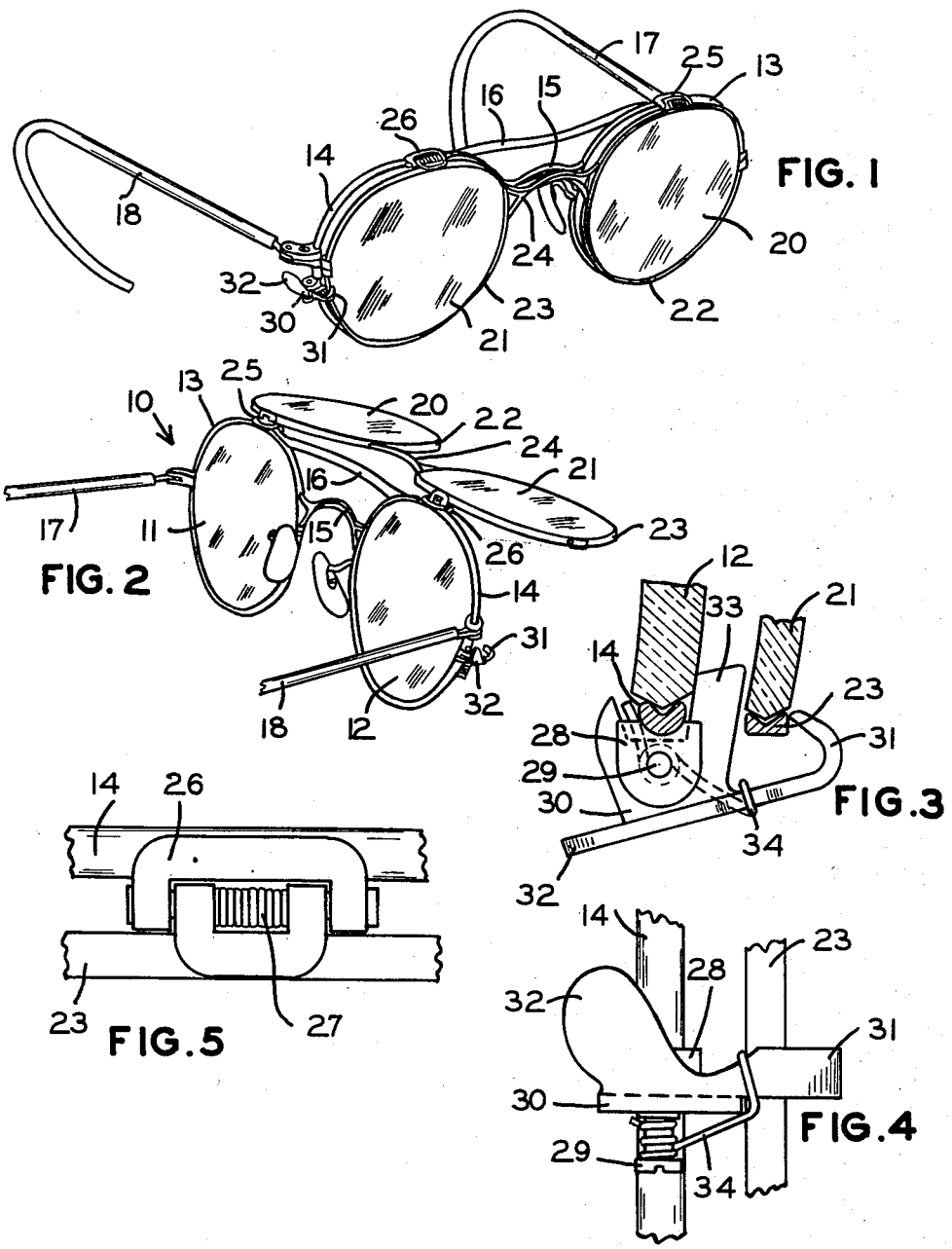
SAMUEL E. BOUCHARD
INVENTOR
BY *J. A. Ellestad*
ATTORNEY Patented May 12, 1942

2,282,637

UNITED STATES PATENT OFFICE 2,282,637

OPHTHALMIC MOUNTING

Samuel E. Bouchard, Rochester, N. Y., assignor to Bausch & Lomb Optical Company, Rochester, N. Y., a corporation of New York Application January 17, 1941, Serial No. 374,879

2 Claims. (Cl. 88—41)

This invention relates to ophthalmic mountings and more particularly it has reference to auxiliary lens attachments for use in connection with spectacles.

One of the objects of my invention is to provide an improved auxiliary lens attachment for spectacles. Another object is to provide an auxiliary lens attachment which is hingedly connected to a spectacle and secured by improved retaining means. These and other objects and advantages reside in certain novel features of construction, arrangement and combination of parts as will hereinafter be more fully described and pointed out in the appended claims.

Referring to the drawing:

Fig. 1 is a perspective view of a spectacle and auxiliary lens attachment embodying my invention.

Fig. 2 is a rear view thereof showing the auxiliary lens attachment in raised position.

Fig. 3 is a top view, with parts in section, showing the retaining means.

Fig. 4 is a side view of same.

Fig. 5 is a view showing the hinged construction.

A preferred embodiment of my invention is shown in the drawing wherein 10 indicates a spectacle frame of a well known construction having the pair of lenses 11 and 12 mounted, respectively, in the rims or eyewires 13 and 14 connected by a bridge 15 and the brace bar 16. The usual temples 17, 18 are hingedly mounted on the spectacle.

The auxiliary lens attachment embodies the two lenses 20 and 21 which are held, respectively, in the rims of eyewires 22 and 23 connected by a bridge 24. The auxiliary lenses 20 and 21 may be colored or tinted or otherwise formed so as to modify or affect the light rays in any desired manner. The upper portions of rims 13 and 14 of the spectacle are connected, respectively, to the upper portions of rims 22 and 23 by the hinges 25 and 26 which embody a spring 27 which normally tends to urge the auxiliary attachment away from the spectacle in a manner well known in the art.

The retaining means, which is shown in detail in Figs. 3 and 4, comprises a post 28 which is soldered or otherwise secured to the side of rim 14. Threaded into post 28 is the screw 29 on which is swingably mounted the lever member 30 which is integrally formed with a forwardly extending hook portion 31, a finger-piece 32 and a stop arm 33. A tension spring 34, mounted on screw 29, engages the member 30 and urges it so that the hook portion 31 engages the front part of the rim 23 or lens 21 of the auxiliary attachment to hold the latter in operative position against the action of springs 27. The stop arm 33 is urged, by spring 34, into contact with the front part of lens 12 of the spectacle. The stop arm 33 thus prevents the lenses 20 and 21 from coming into contact with the lenses 11 and 12 of the spectacle 10. Hence the auxiliary lenses are properly located and scratching or marring of the lens surfaces is avoided.

From the foregoing, it will be obvious that I am able to attain the objects of my invention and provide an improved ophthalmic mounting having a hinged auxiliary lens attachment which is efficient in operation yet simple in construction. The lenses in the auxiliary attachment may be colored goggle lenses with no refractive power or they may be designed to polarize or otherwise modify the light rays passing therethrough. When vision through the auxiliary lenses is not desired, a slight touch of fingerpiece 32 will release the attachment and permit the springs 27 to raise the attachment to the position shown in Fig. 2. To return the auxiliary lenses to operative position, it is necessary to move the attachment down until the hook portion 31 engages the front of the lens or rim.

Various modifications can obviously be made without departing from the spirit of my invention.

I claim:

1. A device of the type described comprising a spectacle having a frame carrying lenses, an auxiliary frame carrying lenses, said auxiliary frame being hingedly secured to the upper part of said spectacle frame, spring means normally urging the auxiliary frame away from the spectacle, and retaining means for selectively holding the auxiliary frame in operative relation in front of the spectacle, said retaining means comprising a member pivotally mounted on the spectacle and having a hook portion for engaging the front of the auxiliary frame, spring means urging said hook portion toward said spectacle and a stop arm carried by said member and projecting between the spectacle and the auxiliary frame when the latter is in operative position.

2. An attachment for a spectacle having rim members along the upper edges of its lenses, said attachment comprising a pair of spaced lenses connected by a bridge, rim members positioned along the upper edges of the last-named lenses, hinge means for connecting the respective rim members of the attachment to the respective rim members of the spectacle, resilient means normally urging said attachment away from the spectacle and retaining means for selectively holding said attachment in operative position before the spectacle, said retaining means comprising a member pivotally mounted on the spectacle and having a hook portion adapted to engage the front portion of the attachment, yieldable means urging said hook portion toward the spectacle and a stop arm carried by said member and movable against the front surface of a lens in the spectacle.

SAMUEL E. BOUCHARD.